United States Patent
Boivin, Jr.

[11] Patent Number: 5,941,528
[45] Date of Patent: Aug. 24, 1999

[54] FISHING CASTING PRACTICE DEVICE

[76] Inventor: Henry E. Boivin, Jr., 13 Depot St., Townsend, Mass. 01469

[21] Appl. No.: 09/080,776

[22] Filed: May 18, 1998

[51] Int. Cl.[6] .............................. A63B 69/00; F41J 1/00
[52] U.S. Cl. ...................... 273/348; 273/140; 273/401; 273/402
[58] Field of Search .................... 273/348, 140, 273/400, 401, 402

[56] References Cited

U.S. PATENT DOCUMENTS

| | | | |
|---|---|---|---|
| 626,995 | 6/1899 | Haigh | 273/140 |
| 1,640,259 | 8/1927 | Vallat | 273/140 |
| 1,910,863 | 4/1933 | Sullivan | 273/140 |
| 2,482,057 | 9/1949 | Fincke | 273/140 X |
| 3,106,394 | 10/1963 | Gelbart | 273/140 X |
| 3,463,494 | 8/1969 | Stroh | 273/140 X |
| 4,165,075 | 8/1979 | Popovich | 273/140 |
| 4,927,161 | 5/1990 | Brenneman | 273/402 |
| 4,974,858 | 12/1990 | Knowlton | 273/401 |
| 4,976,439 | 12/1990 | Kraemer | 273/140 X |
| 5,110,136 | 5/1992 | Land | 273/140 X |
| 5,207,424 | 5/1993 | Bleam et al. | 273/140 |
| 5,297,355 | 3/1994 | O'Brien | 273/140 X |
| 5,397,131 | 3/1995 | Kraemer | 273/140 X |
| 5,639,093 | 6/1997 | Law et al. | 273/140 X |

*Primary Examiner*—William H. Grieb
*Attorney, Agent, or Firm*—Iandiorio & Teska

[57] ABSTRACT

A fishing casting practice device includes a housing with an upper surface having at least two casting target holes of different sizes for overhand, pitching and flipping casting and a front surface having an elongated target hole for skipping casting.

9 Claims, 4 Drawing Sheets

FISHING CASTING PRACTICE DEVICE

FIELD OF INVENTION

This invention relates to a fishing casting practice device, and more particularly to such a device which provides targets for pitching, flipping and skipping as well as overhand casting techniques.

BACKGROUND OF INVENTION

Success at the sport of fishing, and especially bass fishing and bass fishing tournaments, depends in substantial part on the ability to accurately cast the hook or lure. Sophisticated fishermen and tournament competitors use a variety of casting techniques in addition to the conventional overhand cast. For example, when seeking out bass hovering in underwater brushpiles, roots, stumps and logs a "flipping" technique is used. For similar, constrained target casting at longer distances where soft landings are desired to avoid spooking the fish, a technique called "pitching" is used. Often it is necessary to place a lure under an overhanging obstruction such as a dock, float, tree limb or root. This is done by "skipping" the lure. All of these approaches require accuracy and proper execution on the first try or the fish could be alerted or driven away. In tournaments in addition, time is of the essence. It is good preparation for both recreational and competitive anglers to practice the different types of casts and perfect both their execution and accuracy on dry land at every opportunity and in a relaxed atmosphere.

SUMMARY OF INVENTION

It is therefore an object of this invention to provide an improved, simple and inexpensive fishing casting practice device.

It is a further object of this invention to provide such a fishing casting practice device for practicing pitching, flipping, and skipping casting skills as well as overhand casting skills.

It is a further object of this invention to provide such a fishing casting practice device which can be used anywhere indoors or out to hone casting skills.

It is a further object of this invention to provide such a fishing casting practice device which requires no additional equipment, batteries, electrical power, or even water for its full use and benefits.

It is a further object of this invention to provide such a fishing casting practice device which is safe, sturdy and robust.

It is a further object of this invention to provide such a fishing casting practice device which prevents snagging of and avoids damage to the device by hooks and lures.

The invention results from the realization that a truly simple, inexpensive, and easy to use practice device for fishing casting can be made from a basic housing having two or more holes of different sizes to practice pitching, flipping and overhand casting, and having an elongated hole in a first surface for practicing skipping.

This invention features a fishing casting practice device including a housing with an upper surface having at least two casting target holes of different sizes for overhand, pitching and flipping casting and a front surface having an elongated target hole for skipping casting.

In a preferred embodiment there may be at least three casting holes each of a different size. The holes may be disposed in a line with the largest hole between the two smaller holes. The elongated hole may be generally elliptical in shape. The elongated hole may be defined on three sides by the front surface of the housing and on the fourth side by the surface against which the housing is placed. Each casting hole may include a guard member covering its edge to protect the edge of the upper surface of the housing and prevent snagging of hooks and lines. The elongated hole may include a guard member covering its edge to protect the edge of the front surface of the housing and prevent snagging of hooks and lines. The guard member may include a grommet or it may include a tubular member having a longitudinal slit.

DISCLOSURE OF PREFERRED EMBODIMENT

Other objects, features and advantages will occur to those skilled in the art from the following description of a preferred embodiment and the accompanying drawings, in which.

Figure 1:
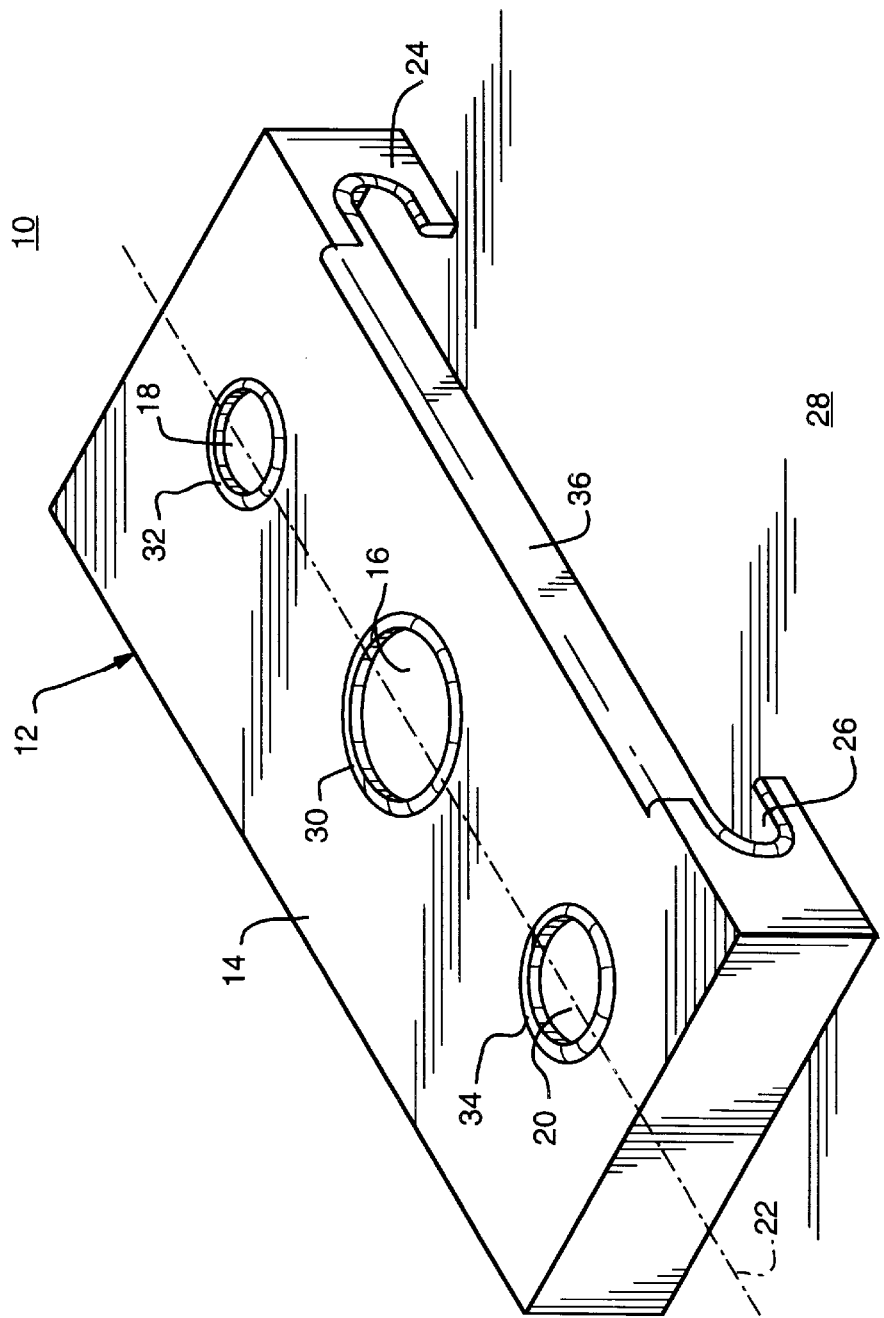
FIG. 1 is a three-dimensional view showing the fishing casting practice device according to this invention.

There is shown in FIG. 1 a fishing casting practice device 10 according to this invention including a housing 12 having an upper surface 14 which includes a central target hole 16 and at least one additional target hole 18 of a different size than hole 16. Additional target holes such as third hole 20 may be included. The holes may be but are not necessary aligned along an axis 22 so that the largest hole 16 is in the center and the smaller holes 20 and 18 are on either side of it. Hole 20 may be larger than hole 18 but smaller than hole 16. All of the holes 16, 18 and 20 may be round and have a diameter in a matter of inches. The entire housing may be approximately 25 inches long, ten inches wide and four inches high. In front surface 24 of housing 12 there is an elongated target hole 26 which may be generally in the shape of an ellipse and have its lower edge actually formed by the floor or other surface 28 on which housing 12 is disposed. Holes 16, 18 and 20 may be any shape or size as may hole 26. In this embodiment holes 16, 18 and 20 are round and have diameters of 13 inches, 7 inches and 9 inches, respectively, and hole 26 is approximately 20 inches by 3¼ inches with the distance between edges 21 and 22 being approximately 15½ inches. The entire housing may be 25½ inches long. Guard rings 30, 32 and 34 may be placed on the edges of each of the holes 16, 18 and 20 to protect the edge of the metal, wood or plastic material of which the housing is made from being torn and worn by the hooks and lures, and also to prevent the hooks and lures from snagging so that they can be easily withdrawn from the hole. A similar guard ring 36 may be provided on elongated hole 26. Typically a weedless jig or rubber bait is used; the weedless jig or hook has a weed guard on it which helps prevent the bait from snagging.

Most any small bait can be used with the box; however, the treble hooks need to be removed from the bait or snags will occur. Good results are obtained with a ¼ ounce weedless jig and rubber bait with a weedless hook.

Figure 2:
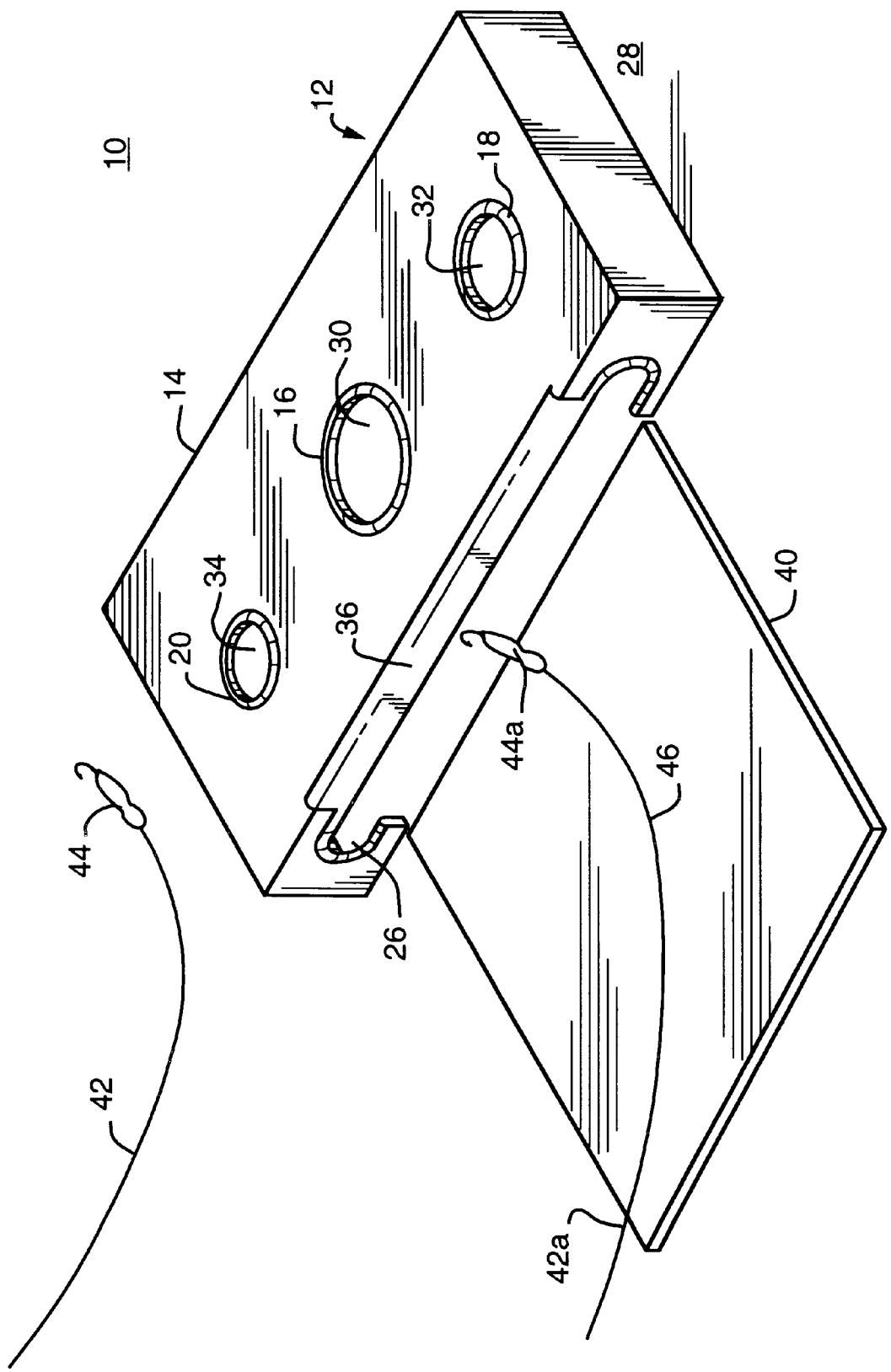
FIG. 2 is a view of the device of FIG. 1 showing the different types of casting which may be practiced with it.

Holes 16, 18 and 20 are generally provided for practicing overhead, pitching and flipping casting while elongated hole 26 is used for practicing skipping casting. For example, as shown in FIG. 2 device 10 may be placed on floor 28 with a pad such as cardboard or plywood 40 in front of elongated hole 26. Then when the line 42 is cast in a typical overhand or flipping or pitching mode, the lure 44 is laid out so that it will drop in the chosen hole 16, 18 or 20. For skipping, line 42a is directed so that the lure first bounces off of plate 40 at point 46 and then enters hole 26. Holes 16, 18 and 20 thereby provide target holes for overhand, flipping and pitching casting while elongated hole 26 is the target hole for practicing skipping casting.

Figure 3:
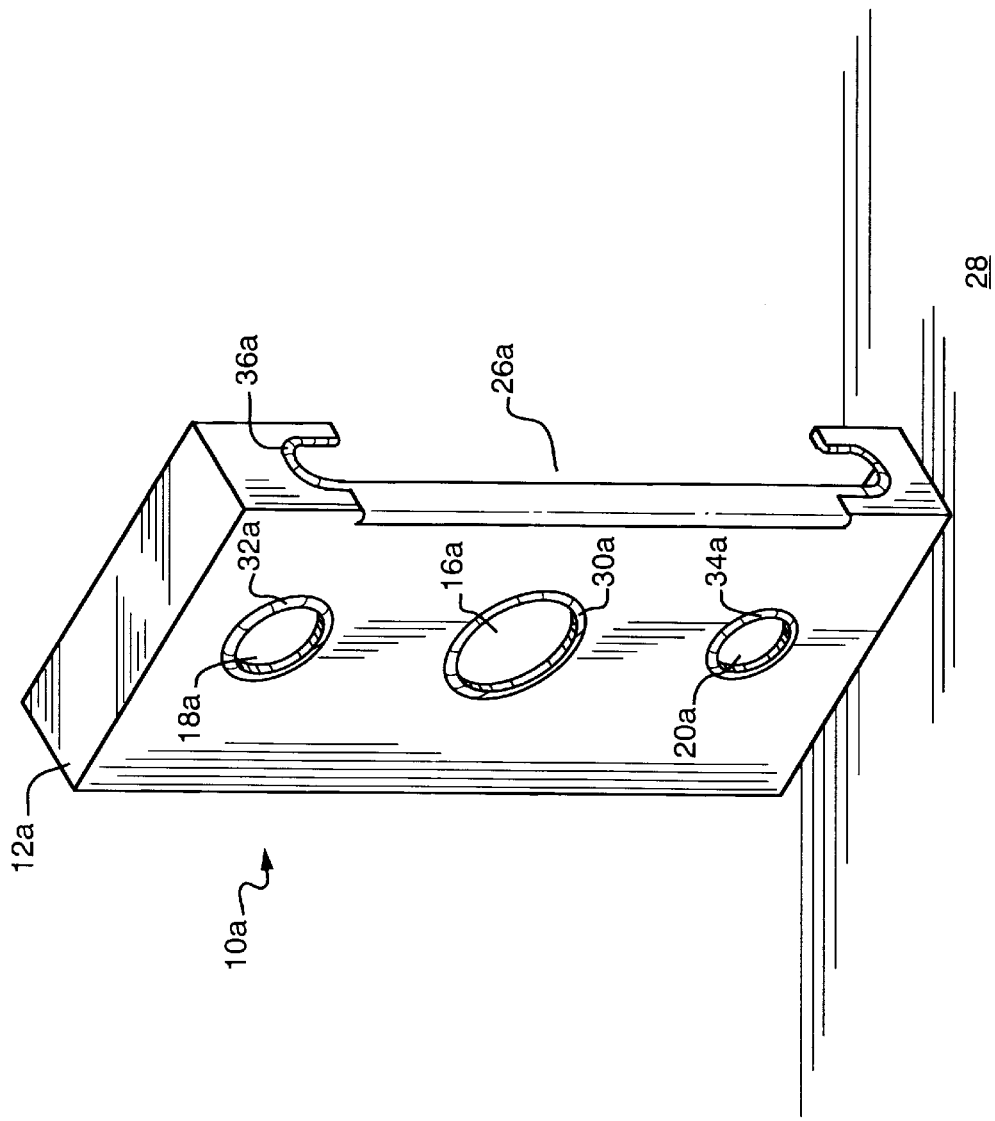
FIG. 3 shows the device of FIGS. 1 and 2 oriented in the vertical position.
Figure 4:
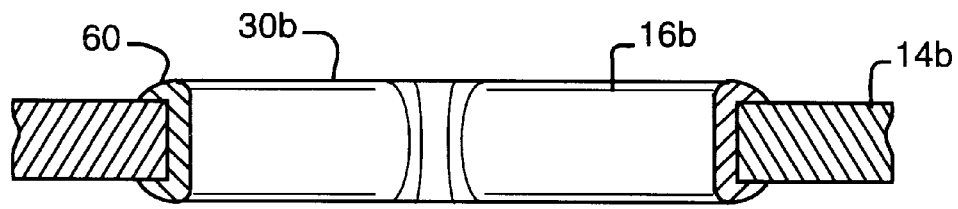
FIG. 4 is a schematic cross-sectional elevational view with parts broken away of a guard ring implemented with a grommet.
Figure 5:
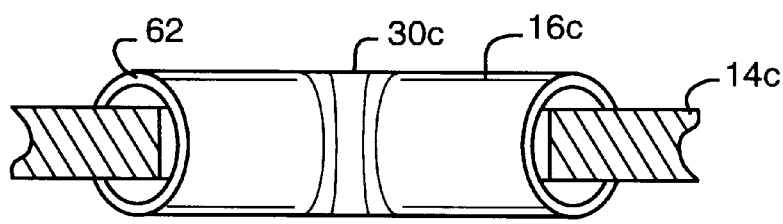
FIG. 5 is a view similar to FIG. 4 with the guard ring implemented as a longitudinally slit tubular member.

Although device 10 is typically used with the housing set flat on the floor or the ground as shown in FIGS. 1 and 2, this is not a necessary limitation of the invention. For example, it may be stood on its end as shown in FIG. 3 where one end of housing 12 is on floor 28. Here the elongated hole 26a is more open. The guard members 30, 32 and 34 may be implemented using a grommet 60, FIG. 4, as shown with respect to hole 16b. The grommet may be made of hard plastic or rubber and have smooth curves to avoid snagging the hook and lure. Alternatively, guard member 30c may be made using a tubular element 62 which has a longitudinal slit, FIG. 5, to allow it to be fit over the edge of surface 14 to protect that edge and prevent the lure and hook from snagging.

Figure 6:
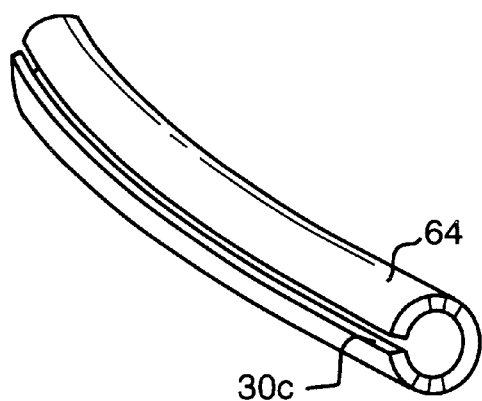
FIG. 6 is a three-dimensional view of the longitudinally slit tubing used as the guard member in FIG. 5.

FIG. 6 depicts the slit tubular member before it has been installed in a target hole where it is depicted as a tubular member having a round cross section with an elongated slit 64.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A fishing casting practice device comprising:
   a housing with an upper surface having at least two casting target holes of different sizes for overhand, pitching and flipping casting and a front surface having an elongated target hole for skipping casting.

2. The fishing casting practice device of claim 1 in which there are at least three said casting holes each of a different size.

3. The fishing casting practice device of claim 2 in which said holes are disposed in a line with the largest hole between the two smaller holes.

4. The fishing casting practice device of claim 1 in which said elongate hole is generally elliptical in shape.

5. The fishing casting practice device of claim 1 in which said elongate hole is defined on three sides by the front surface of the housing and on the fourth side by the surface against which the housing is placed.

6. The fishing casting practice device of claim 1 in which each said casting hole includes a guard member covering its edge to protect the edge of the housing and prevent snagging of hooks and lines.

7. The fishing casting practice device of claim 1 in which said elongate hole includes a guard member covering its edge to protect the edge of the front surface of the housing and prevent snagging of hooks and lines.

8. The fishing casting practice device of claims 6 or 7 in which said guard member includes a grommet.

9. The fishing casting practice device of claims 6 or 7 in which said guard member includes a tubular member having a longitudinal slit.

* * * * *